Figure 1:
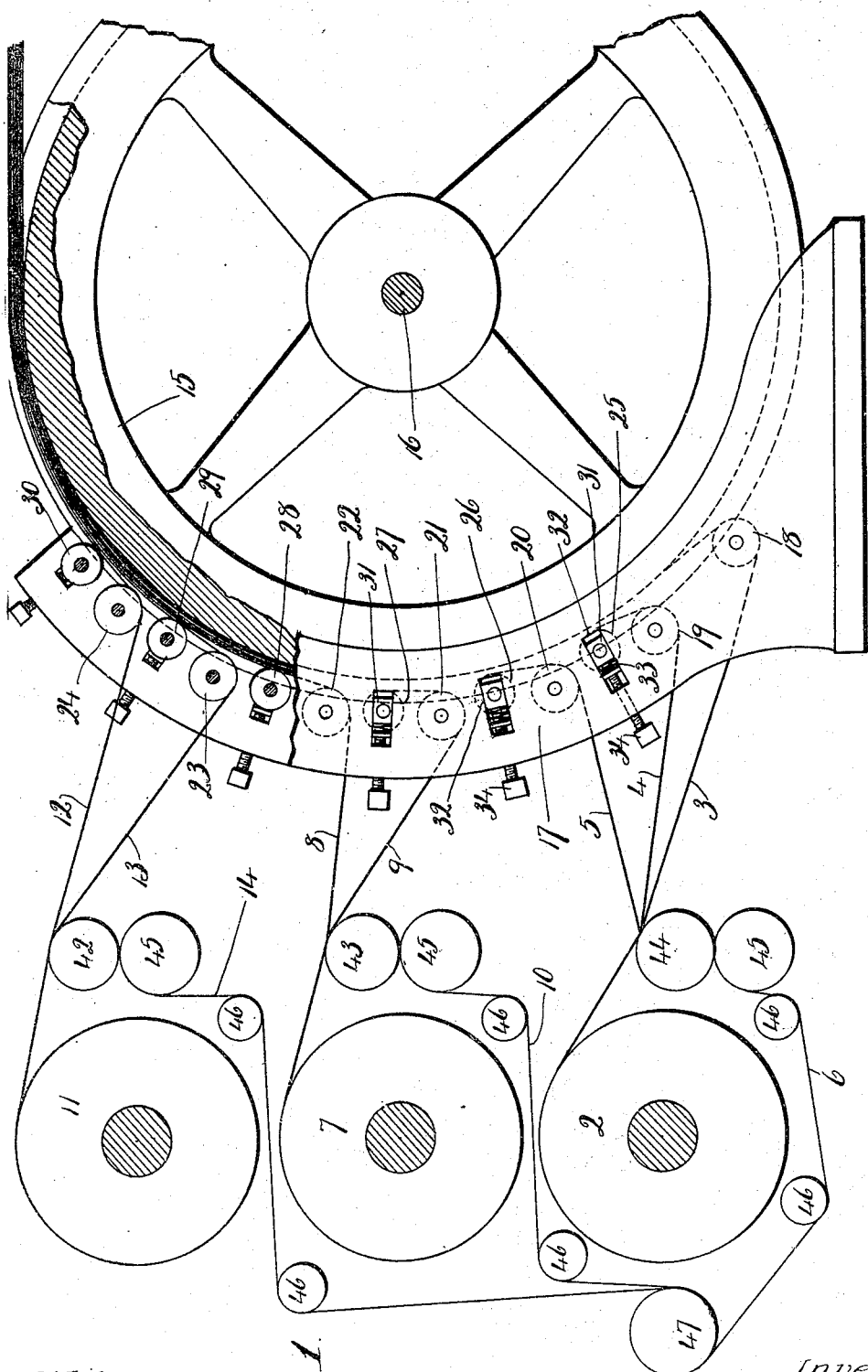

W. H. CROOK.
MACHINE FOR FORMING AUTOMOBILE TIRE TREADS.
APPLICATION FILED OCT. 3, 1910.

981,981.

Patented Jan. 17, 1911.

2 SHEETS—SHEET 1.

Witnesses
C. J. Reed
C. L. Reed

Inventor
William H. Crook
By Atty's
Seymour & Earle
Frederic C. Earle

W. H. CROOK.
MACHINE FOR FORMING AUTOMOBILE TIRE TREADS.
APPLICATION FILED OCT. 3, 1910.
981,981.
Patented Jan. 17, 1911.
2 SHEETS—SHEET 2.
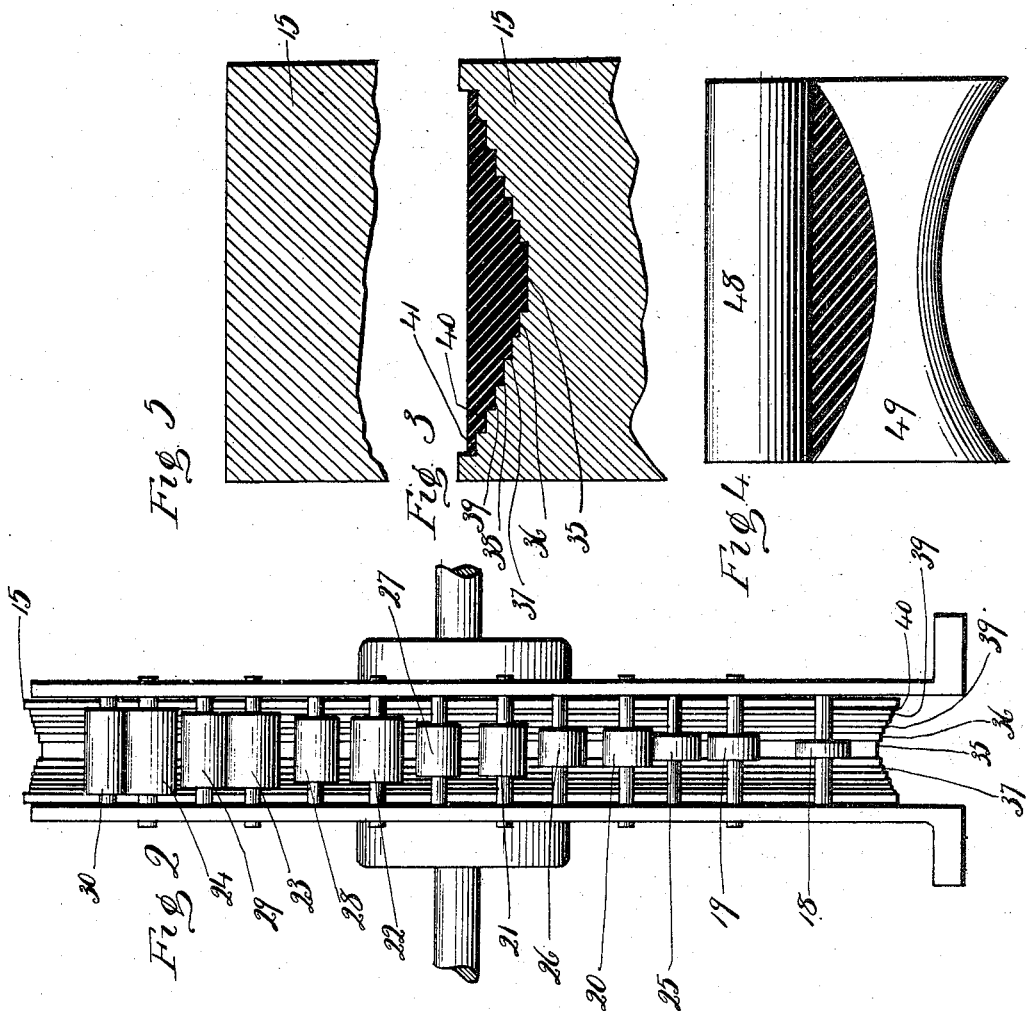
Witnesses
C. J. Reed.
C. L. Weed
Inventor
William H. Crook.
By Attys
Seymour H Earle
Frederic C Earle

UNITED STATES PATENT OFFICE.

WILLIAM H. CROOK, OF ANSONIA, CONNECTICUT, ASSIGNOR TO THE BIRMINGHAM IRON FOUNDRY, OF DERBY, CONNECTICUT, A CORPORATION.

MACHINE FOR FORMING AUTOMOBILE TIRE-TREADS.

981,981.  Specification of Letters Patent.  Patented Jan. 17, 1911.

Application filed October 3, 1910. Serial No. 585,108.

*To all whom it may concern:*

Be it known that I, WILLIAM H. CROOK, a citizen of the United States, residing at Ansonia, in the county of New Haven and State of Connecticut, have invented a new and useful Improvement in Machines for Forming Automobile Tire-Treads; and I do hereby declare the following, when taken in connection with the accompanying drawings and the letters of reference marked thereon, to be a full, clear, and exact description of the same, and which said drawings constitute part of this specification, and represent, in—

Figure 1 a side view partially in section of a machine for forming vehicle tire treads constructed in accordance with my invention. Fig. 2 an edge view of the housing and drum with the adjusting screws removed. Fig. 3 an enlarged sectional view of the periphery of the drum showing sections of rubber thereon. Fig. 4 a face view of the finishing rolls. Fig. 5 a section of a drum with a flat face.

This invention relates to an improvement in machines for forming automobile tire treads. The tread or last covering of automobile tires is made up from various layers of rubber or layers of rubber and fabric. In the usual construction of these treads the strips of rubber from which they are formed are cut in strips of different widths, then cut to proper length and built up by hand; that is, one layer placed upon another and rolled onto it, then a third strip upon that, and so on until the proper thickness is obtained. This is an expensive method and difficulty is experienced because air bubbles will form between the strips.

The object of this invention is to provide an automatic device by which the strips may be taken from rolls and united over the surface of a drum so that strips of great length are formed; and the invention consists in the construction hereinafter described and particularly recited in the claims.

Preferably the rubber as it comes from the calender will be wound onto rolls with strips of sheeting so that the convolutions of rubber will not adhere. In illustrating my invention I will show and describe a device in which seven strips of material are employed in forming the tread.

Upon a roll 2 three strips of rubber 3, 4 and 5 will be wound together with a strip of sheeting 6. These strips are narrow strips, 3 being the narrowest, 4 the next in width, and 5 still wider. Upon the roll 7 two strips 8 and 9 will be wound with a strip of sheeting 10, and upon the roll 11 strips 12 and 13 will be wound with a strip of sheeting 14. Adjacent to these rolls I mount a drum 15 upon an axle 16, and adjacent to the periphery of this drum is a segmental housing 17 carrying a series of guide-rolls 18, 19, 20, 21, 22, 23 and 24, and corresponding in number to the number of strips, in advance of each guide-roll is a pressure roll 25, 26, 27, 28, 29 or 30. These rolls are mounted in boxes 31 sliding in slots 32 and are forced against the edge of the drum 15 by springs 33 which may be adjusted by screws 34. The face of the drum is formed as shown in Fig. 3, with a groove 35 having a series of steps 36, 37, 38, 39, 40 and 41 corresponding in width to the width of the several strips to be wound; or the face of the drum may be plain instead of stepped as shown in Fig. 5. The said guide-rolls may be set at a suitable angle to insure the right delivery of the strip guided by it upon the strip already upon the drum. Adjacent to the stock-rolls 2, 7 and 11 are guide-rolls 42, 43 and 44, to guide or direct the strips from the stock-rolls to the drum 15. Beneath each guide-roll is an idler 45 over which the fabric is directed around rollers 46 to a sheet-receiving roll 47.

The feed rolls and the drum are revolved by suitable mechanism, not shown, and the several strips of fabric will be delivered to the drum on which one is pressed against the other. Thus the strip 3 passing under the guide roll 18 enters the groove 35, and the strip 4 passing under the guide-roll 19 upon the steps 36 and is forced into contact with the strip 3 by the pressure roll 25; and owing to the angle at which the strip 4 passes into engagement with the strip 3 there is no danger of bubbles forming as the pressure roll will prevent it. The strip 5 passing under the guide roll 20 enters the groove upon the steps 37 and is pressed onto the face of the strip 4 by the pressure roll 26, and so on, each successive strip being wider than the preceding one, and is pressed into engagement with it. The completed strip is delivered from the drum to any convenient roll or table. This fabric as it comes from the drum will be stepped, as it might be said, on opposite sides and so as to give it a rounded surface the completed strip as it passes over the drum 15 may pass between finishing rolls 48 and 49.

As before stated, in some forms of treads strips of fabric are introduced and this may be readily done by substituting fabric for any one of the strips of rubber. Thus, for instance, the strip 9 might be fabric instead of rubber so as to interpose a strip of fabric in the center of the tread.

It is apparent without illustration that instead of winding the strips from the rollers 2, 7 and 11, that these strips might be taken directly from the calender rolls of a rubber working machine.

I claim:—

1. A machine for forming the treads for automobile tires comprising a drum having a groove in its face, a housing adjacent to the drum, guide rolls mounted in said housing, and pressure rolls adjacent to said guide rolls, whereby strips passing around the guide rolls will be pressed one upon another.

2. A machine for forming the treads for automobile tires comprising a drum having a stepped groove in its face, a segmental housing adjacent to the drum, guide rolls mounted in said housing, and pressure rolls adjacent to said guide-rolls, whereby strips passing around the guide-rolls will be pressed one upon another.

3. A machine for forming the treads for automobile tires comprising a drum having a stepped groove in its face, a segmental housing adjacent to the drum, guide-rolls mounted in said housing, and spring-actuated pressure rolls whereby strips passing around the guide-rolls will be imposed by pressure one upon another.

4. A machine for forming the treads for automobile tires comprising a drum having a stepped groove in its face, a segmental housing adjacent to the drum, guide-rolls mounted in said housing, pressure rolls adjacent to said guide-rolls, stock rolls mounted adjacent to the housing and each adapted to carry a series of strips, and feed rolls between the said stock rolls and a housing for directing the strips thereto.

5. A machine for forming the treads for automobile tires comprising a drum having a stepped groove in its face, a segmental housing adjacent to the drum, guide-rolls mounted in said housing, pressure rolls adjacent to said guide-rolls, stock rolls mounted adjacent to the housing and each adapted to carry a series of strips, feed rolls between the said stock rolls and housing for directing the strips thereto, and idlers and rollers for conducting strips of sheeting from the stock rolls to a sheet-receiving roll.

In testimony whereof, I have signed this specification in the presence of two subscribing witnesses.

WILLIAM H. CROOK.

Witnesses:
M. E. DERMODY,
H. F. NANNING.